United States Patent [19]

Abu-Amara et al.

[11] Patent Number: 5,883,819
[45] Date of Patent: Mar. 16, 1999

[54] METHOD AND SYSTEM FOR QUALITY OF SERVICE ASSESSMENT FOR MULTIMEDIA TRAFFIC UNDER AGGREGATE TRAFFIC CONDITIONS

[75] Inventors: Hosame Hassan Abu-Amara, Richardson; Venkat Kotamarti, Dallas, both of Tex.

[73] Assignee: Northern Telecom Limited, Quebec, Canada

[21] Appl. No.: 775,159

[22] Filed: Dec. 31, 1996

[51] Int. Cl.$^6$ ....................................................... G06F 9/455
[52] U.S. Cl. .............................................................. 364/578
[58] Field of Search ........................... 395/500; 364/578; 370/403, 231

[56] References Cited

U.S. PATENT DOCUMENTS

| | | | |
|---|---|---|---|
| 5,282,199 | 1/1994 | Herzberg et al. | 370/403 |
| 5,357,507 | 10/1994 | Hughes et al. | 370/60 |
| 5,408,465 | 4/1995 | Gusella et al. | 370/231 |

OTHER PUBLICATIONS

I. Hsu et al., "Admission Control for Multi–Class ATM Traffic With Overflow Constraints," Computer Networks and ISDN Systems, 1996, pp. 1739–1751.
Y. Takagi et al., "Priority Assignment Control of ATM Line Buffers With Multiple QOS Classes," IEEE 1991, pp. 1078–1092.
C.I. Ani et al., "Methodology for Derivation of Network Resources to Support Video–Related Services in ATM–Based Private Wide–Area Networks," IEE Proceedings–Communications, vol. 142, No. 4, Aug. 1995, pp. 233–237.
R. Jain, "Congestion Control and Traffic Management in ATM Networks: Recent Advances and a Survey," Computer Networks and ISDN Systems, 1996, pp. 1723–1738.

*Bandwidth Assignment and Virtual Call Blocking in ATM Networks*, Decina et al., May, 1990.

*Primary Examiner*—Kevin J. Teska
*Assistant Examiner*—Dan Fiul
*Attorney, Agent, or Firm*—John D. Crane; Andrew J. Dillon

[57] ABSTRACT

A method and system for assessing quality of service for multimedia traffic under aggregate traffic conditions in a shared transmission network, such as an ATM network. A total number of different traffic services as well as a maximum number of sources for each traffic service are specified by a network operator/designer. Next, for each traffic service a specification of peak rate, average idle sojourn time and an average burst sojourn time are determined, either based upon available standards or calculated based upon models of the traffic services. The total available system bandwidth is specified by a network operator/designer. Finally, the number and size of queues utilized for receiving packetized telecommunication traffic within the network are specified. The maximum packet loss ratio, average delay for a packet traversing the network and the probability that jitter (delay variations) will exceed a specified threshold are then calculated for the size and number of queues specified, permitting the quality of service within the network to be accurately and efficiently assessed.

14 Claims, 3 Drawing Sheets

METHOD AND SYSTEM FOR QUALITY OF SERVICE ASSESSMENT FOR MULTIMEDIA TRAFFIC UNDER AGGREGATE TRAFFIC CONDITIONS

CROSS-REFERENCE TO RELATED APPLICATION

This application is related to co-pending U.S. patent application Ser. No. 08/775,158, filed of even date herewith by the inventors herein named. The aforementioned co-pending application is hereby incorporated herein by reference thereto.

BACKGROUND OF THE INVENTION

1. Technical Field

The present invention relates to improvements in network design and in particular to improved methods and systems for quality of service assessment for multimedia traffic within a network. Still more particularly, the present invention relates to a method and system for quality of service assessment for multimedia traffic under aggregate traffic conditions in a shared transmission medium.

2. Description of the Related Art

No where has the explosion of modern technology been more evident than in the field of communication. The number and type of communication services has been rapidly expanding, including so-called "multimedia" services such as video teleconferencing, video/movies on demand and the like.

The intermixing of these multimedia services with traditional data and voice communications within a shared transmission medium has presented various design problems. For example, a system which receives packetized telecommunication traffic from multiple multimedia services typically places the received packets within a queue within either a central queue or within a queue which is dedicated to a particular service. This can occur, for example, in ATM networks wherein multiple users subscribe to diverse services, such as video-conferencing and data retrieval, and share the same network.

Since a system can typically process, at most, n packets per time unit, if there are more than n subscribers for the services, the received packets are not immediately processed by the system but instead are queued either in one central queue or within a queue dedicated to a particular service, for future processing. During heavy use periods, these queues may become quite large and packets may be selectively discarded based upon a priority scheme.

Three network quality of service measures are of prime importance to network designers. Network designers must consider the maximum packet loss rate within the network, the maximum delay for a packet traversing the network and the maximum jitter (delay variation) which packets experience during network traversal. These three measures are utilized to indicate the quality of service within a network. In order to efficiently design a multimedia network, an accurate assessment of the quality of service measures is necessary, so as to satisfy customer expectations, build the network economically and utilize the network efficiency. Since diverse multimedia services may have diverse quality of service requirements, it is desirable to provide a technique for calculating quality of service values rapidly with as few traffic parameters as necessary so as not to waste network bandwidth on measurements.

In the past, attempts at statistically modeling aggregate traffic which originates from homogenous services with similar traffic types and similar characteristics have been proposed. For example, the Poisson Process is widely utilized to model aggregate traffic from voice sources. Similarly, the discreet Auto Regressive Process has been utilized to model aggregate traffic from video-teleconferencing sources. A Markov Modulated Poisson Process is often utilized to model aggregate traffic from data sources. These techniques typically required complex mathematical expressions which are not explicit and which required time-consuming numerical methods to solve. In high speed multimedia networks, the assessment of quality of service value must be performed rapidly and in real-time. Furthermore, prior art techniques for assessing quality of service within a network did not distinguish between networks which utilize a central queue and networks which utilize multiple queues, that is, one queue per service.

Thus, those skilled in the art will appreciate that a method and system for accurately and efficiently assess calculating the quality of service of multimedia traffic within a shared transmission medium would greatly enhance the efficiency of a network design and the level of customer satisfaction.

SUMMARY OF THE INVENTION

It is therefore one object of the present invention to provide an improved network design.

It is another object of the present invention to provide an improved method and system for quality of service assessment for multimedia traffic within a network.

It is yet another object of the present invention to provide an improved method and system for quality of service assessment for multimedia traffic under aggregate traffic conditions in a shared transmission medium.

The foregoing objects are achieved as is now described. A method and system are provided for assessing quality of service for multimedia traffic under aggregate traffic conditions and a shared transmission medium, such as an ATM network. A total number of different traffic services as well as a maximum number of sources for each traffic service are specified by a network operator/designer. Next, for each traffic service a specification of peak rate, average idle sojourn time and an average burst sojourn time are determined, either based upon available standards or calculated based upon models of the traffic services. The total available system bandwidth is specified by a network operator/designer. Finally, the number and size of queues utilized for receiving packetized telecommunication traffic within the network are specified. The maximum packet loss ratio, average delay for a packet traversing the network and the probability that jitter (delay variations) will exceed a specified threshold are then calculated for the size and number of queues specified, permitting the quality of service within the network to be accurately and efficiently assessed.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
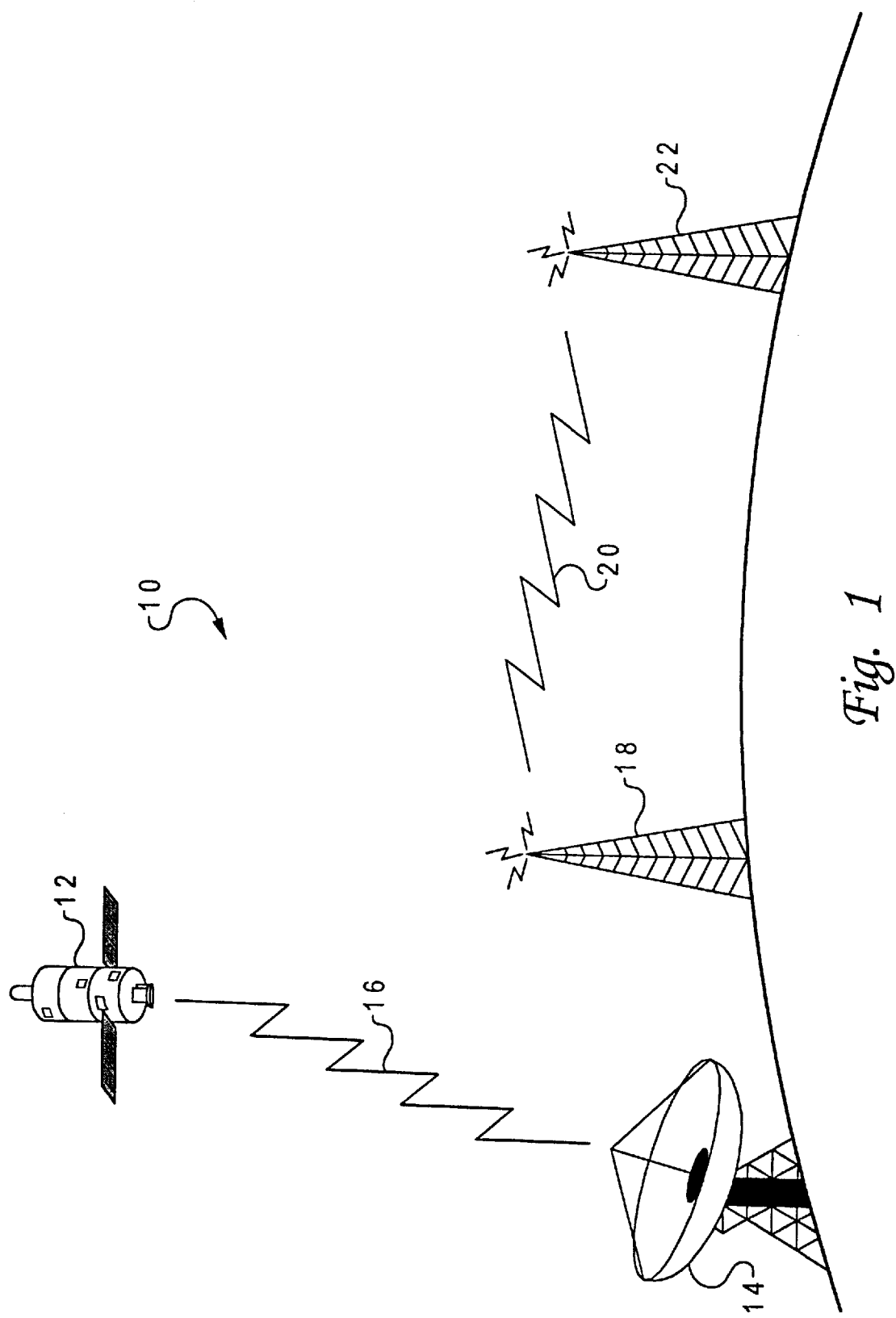
FIG. 1 is a schematic representation of a communication network which can incorporate multimedia traffic within an shared transmission medium.

With reference now to the figures and in particular with reference to FIG. 1, there is depicted a schematic representation of a communication network which incorporates multimedia traffic within a shared transmission medium. As illustrated, communication network 10 may include multiple transmission sources and receivers coupled together utilizing various transmission medium. For example, one type of network which may advantageously utilize the method and system of the present invention, is an ATM network which is utilized in conjunction with satellite communication. Thus, satellite 12 may communicate with earth station 14 over transmission medium 16. Similarly transmission tower 18 may communicate with transmission tower 22 over transmission medium 20. Of course, those skilled in the art will appreciate that transmission medium 16 will comprise a high frequency wide bandwidth radio frequency transmission medium; however, the method and system of the present invention will find application in any system in which aggregate multimedia traffic will occupy a shared transmission medium, such as, for example, a fiber optic transmission medium.

Figure 2:
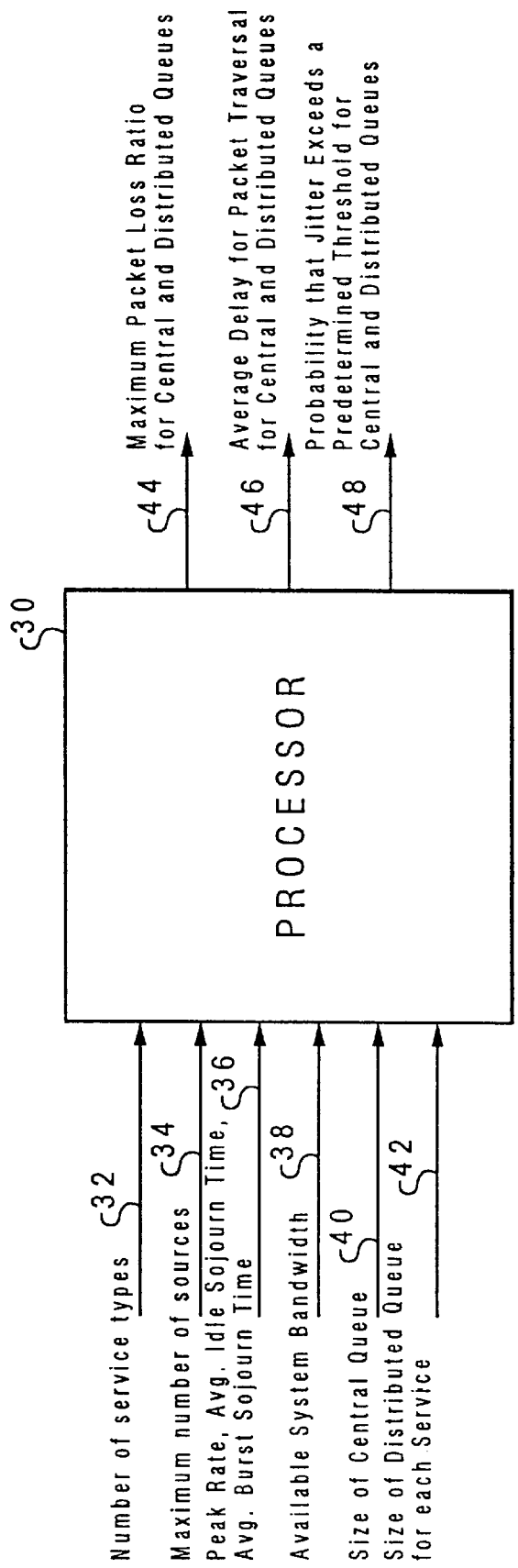
FIG. 2 is a high level block diagram of a system for assessing the quality of service for multimedia traffic under aggregate traffic conditions within a shared transmission medium.

Referring now to FIG. 2 there is depicted a high level block diagram of a system for assessing quality of service for multimedia traffic under aggregate traffic conditions within a shared transmission medium in accordance with the present invention. As illustrated, the system depicted in FIG. 2 utilizing, as its central element, processor 30. Processor 30 may comprise an appropriately programmed computer such as a personal computer, workstation or other suitable computer possessing sufficient processor assets and processing capability to create the model which will be described herein.

Those skilled in the art will appreciate that in order to provide an accurate assessment of quality of service for multimedia traffic under aggregate traffic conditions within a shared transmission medium it is necessary to accurately describe the various types of aggregate traffic which originate from the heterogeneous sources which may include widely diverse traffic types and characteristics. Thus, it is important to generate appropriate parameters for the assessment so that these parameters may be utilized as an input to a network design tool.

As depicted, processor 30 utilizes six different inputs to generate three different outputs. Input 32, as depicted within FIG. 2, comprises the total number of different types of telecommunication traffic within the transmission medium. This number is typically provided by the network operator or the design engineer specifying a particular network. Each type of telecommunication traffic is referred to herein as "service." These services may include voice, data, teleconferencing, video on demand and other similar communication types.

Next, as specified at input 34, the maximum number of sources for each service are also utilized as an input. The maximum number of sources is specified by the network operator or network designer. Thus, a network designer will typically specify the maximum number of subscribers for each type of service which is desired to be accommodated within the network.

Next, input 36 comprises a specification of the peak rate, average idle sojourn time and average burst sojourn time for each service within the network. The peak rate for each service may be obtained from a standard body such as the International Telecommunication Union-Telecommunication (ITU-T) or obtained from measurements or research literature. The average idle sojourn time and average burst sojourn time may be similarly determined, or may be determined in the method set forth in the co-pending patent application referenced above.

Next, as depicted at input 38, the total available system bandwidth in bits per second is specified. This number is typically provided by the network operator or network designer. Those having skill in the art will appreciate that the available bandwidth for a network will have a critical impact upon the quality of service within a network.

Next, input 40 comprises an indication of whether or not all services within the network share a central queue and if so, a specification of the queue size in bits. Again, this input is clearly specified by the network operator or the design engineer specifying the network.

Finally, input 42 comprises an indication of whether or not each service within the network has a separate queue associated therewith and a specification of the queue size in bits available for each service. Again, this information is provided by the network operator and design engineer.

These inputs, when combined in the manner which will be described in detail below, can be utilized to produce outputs 44, 46, and 48 which, when considered together, provide an accurate assessment of the quality of service for multimedia traffic under aggregate traffic conditions within a shared transmission medium.

Thus, output 44 comprises the maximum packet loss ratio for each service, both for design alternatives in which service shares a central queue and for those applications in which service has a unique queue associated therewith.

Output 46 comprises the average delay for packets traversing the network for each service. This average delay is calculated for situations in which all services share the same central queue and individually for each service in situations in which each service has a unique separate queue.

Finally, output 48 comprises the probability that jitter (delay variation) for a particular service exceeds a predetermined threshold. This value, as above, is assigned for situations in which all services share the same central queue and for each service which utilizes a unique queue associated therewith.

Figure 3:
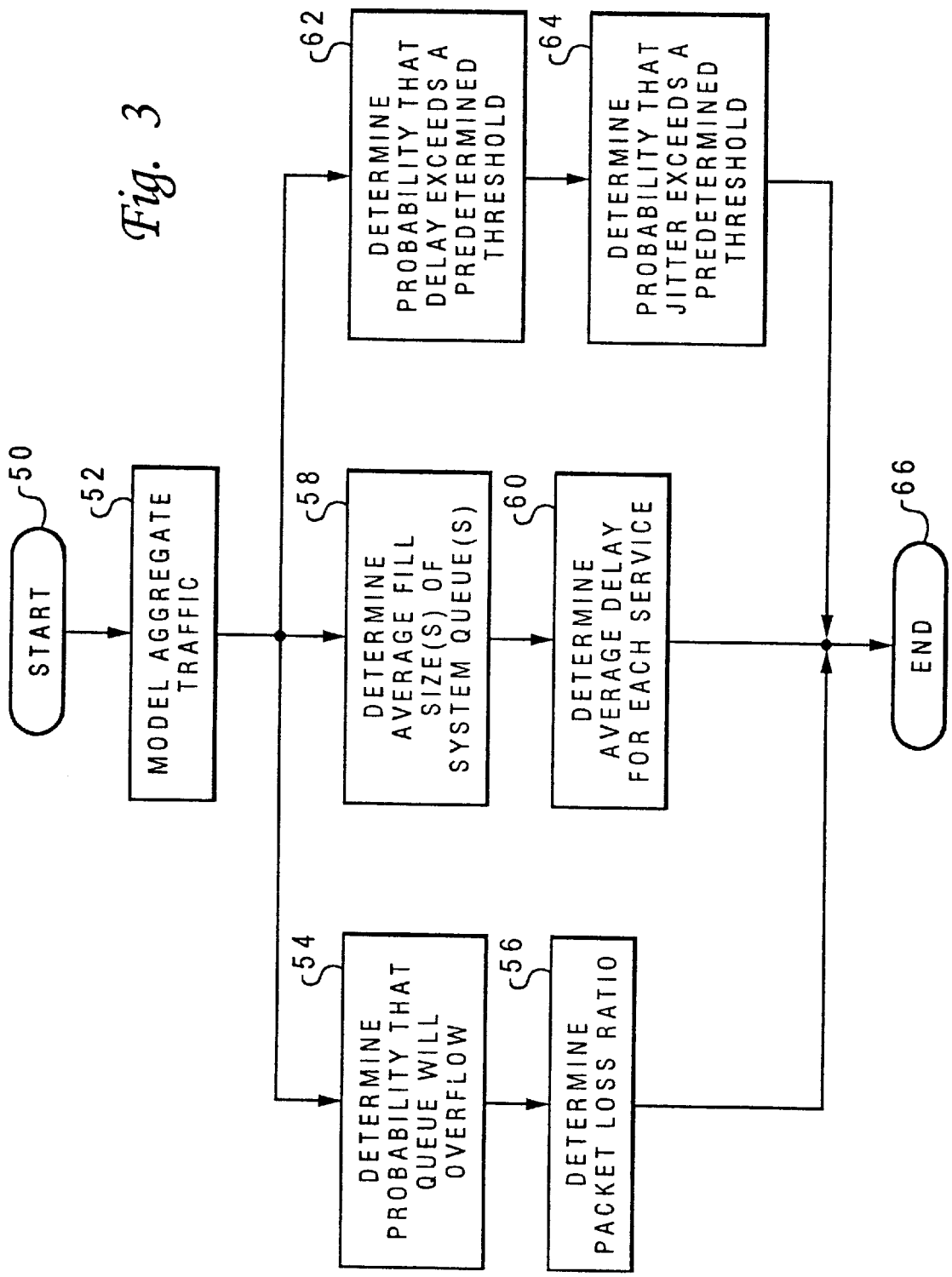
FIG. 3 is a high level logic flowchart of the method for assessing quality of service for multimedia traffic under aggregate traffic conditions within a shared transmission medium in accordance with the present invention.

Finally, with reference to FIG. 3, there is depicted a high level logic flowchart of the method for assessment of quality of service for multimedia traffic under aggregate traffic conditions within a shared transmission medium in accordance with the present invention. As illustrated, the process begins at block 50 thereafter passes to block 52. Block 52 depicts the modeling of the aggregate traffic within the network from each traffic source as a stochastic system. This model then identifies the peak rate ($R_i$), average idle sojourn time ($1/\lambda_i$) and the average burst sojourn time ($1/\mu_i$) for each service i. As noted above, these values may be obtained from measurements, research literature or standard body such as the ITU-T. Additionally, the average idle sojourn time and average burst sojourn time may be calculated in the method set forth within the co-pending patent application referenced above. Next, the average utilization ($u_i$) is defined as follows:

$$u_i = \frac{\frac{1}{\mu_i}}{\frac{1}{\mu_i} + \frac{1}{\lambda_i}}$$

Next, the process passes to block 54. Block 54 illustrates the determination of the probability that the queues within the system will overflow. This of course will vary based upon whether or not a single central queue or multiple distributed queues are utilized. If all services within the network share the same central queue of size x, and N is the total number of users within the network then the system capacity may be defined as C, then the queue overflow probability G(x) is equal to minimum $\{G^{(1)}(x), G^{(2)}(x)\}$, where $G^{(1)}(x)$ and $G^{(2)}(x)$ are specified as follows:

$$G^{(1)}(x) = e^{zx}$$

Where z is specified by $$C = \frac{\sum_{i=1}^{N} \left[ (\lambda_i + \mu_i + R_i * z) - \sqrt{(\lambda_i + \mu_i + R_i * z)^2 - 4 * \lambda_i * R_i * z} \right]}{2 * z}$$

Thereafter, let m equal $$\sum_{i=1}^{N} R_i * u_i$$

Let σ equal $$\sum_{i=1}^{N} R_i * \sqrt{N_i * u_i * (1 - u_i)}$$

Thereafter:

$$G^{(2)}(x) = e^{\frac{(\frac{C-m}{\sigma})^2 - \ln(2\pi)}{2}}$$

(independent of $x$)

However, if there are multiple services within the network and there are $N_i$, subscribers who utilize service i, and service i has a unique queue of $x_i$ and a reserve system capacity $C_i$, then the queue overflow probability $G_i(x_i)$ is minimum $\{G_i^{(1)}(x_i), G_i^{(2)}(x_i)\}$, specified as follows:

$$G_i^{(1)}(x_i) = e^{z_i x_i}$$

where $z_i$ is specified by:

$$C = \frac{(\lambda_i + \mu_i + R_i * z_i) - \sqrt{(\lambda_i + \mu_i + R_i * z_i)^2 - 4 * \lambda_i * R_i * z_i}}{2 * z_i}$$

If we let $m_i$ equal $N_i * R_i * u_i$ and let σ equal $$R_j * \sqrt{N_j * u_j * (1 - u_j)}$$

Then:

$$G_i^{(2)}(x_i) = e^{\frac{-(\frac{C_i - m_i}{\sigma_i})^2 - \ln(2\pi)}{2}}$$

Next, block 56 illustrates the determination of a packet loss ratio for each service. Thus, if all services within the network share the same central queue of size x, then the packet loss ratio for each service is G(x). Further, if each service i has a unique queue of size $x_i$, then the packet loss ratio for each service i is $G_i(x_i)$.

Referring now to block 58, the average fill sizes for the system queues are determined. This is accomplished by utilizing the model created in block 52. Thus, if N is the total number of users within the network and if all services share the same central queue of size x, and the system capacity is C, then the average fill size of the system queue is specified as $-1/z$ where z is specified by $$C = \frac{\sum_{i=1}^{N} \left[ (\lambda_i + \mu_i + R_i * z) - \sqrt{(\lambda_i + \mu_i + R_i * z)^2 - 4 * \lambda_i * R_i * z} \right]}{2 * z}$$

However, if there are multiple services within the network and there are $N_i$ subscribers who utilize service i, and each service i has a unique queue of size $x_i$ and a reserved system capacity of $C_i$, then the average fill size of the system queue is specified as $-1/z_i$ where $z_i$ is specified by:

$$C = \frac{(\lambda_i + \mu_i + R_i * z_i) - \sqrt{(\lambda_i + \mu_i + R_i * z_i)^2 - 4 * \lambda_i * R_i * z_i}}{2 * z_i}$$

Next, referring to block 60, there is illustrated the determination of the average delay for each service. This calculation occurs as follows, if all services share the same central queue of size x, then the average delay for each service i is specified as follows:

$$\text{average delay} = \frac{\text{average fill size}}{\min(\mu_i, P)}, \text{ where } P = -(x - 1) + \sqrt{(x^2 - 1)}$$

Further, if each service i has a unique queue of size $x_i$, then the average delay for each service i is specified as follows:

$$\text{average delay} = \frac{\text{average fill size for service } i}{\min(\mu_i, P_i)},$$

$$\text{where } P_i = -(x_i - 1) + \sqrt{x_i^2 - 1}$$

Referring now to block 62, the model created within block 52 is utilized to find the probability that the delay for a service i exceeds some threshold $D_{t,i}$. This process begins by assuming that T is the size of each packet in bits. For example, T equals (53 bytes*8 bits per byte) or 424 bits for a typical ATM cell. Next, the queue delay function $T_i(t)$, the probability that the delay is at most t, is determined in accordance with the following rules:

If all services share the same central queue, then $T_i(t)$ is equal to 1−G(t*T), where G is specified as noted above.

Further, if each service i has a unique queue, then $T_i(t)$ is equal to 1−$G_i$(t*T), where $G_i$ was specified above.

Thereafter, the probability that a delay for service i exceeds some threshold $D_{t,i}$ is 1−$T_i(D_{t,i})$.

Next, referring to block 64, the probability that jitter for a service i exceeds some threshold $J_{t,i}$ is determined. The queue jitter function $J_i(t)$, i.e., the probability that jitter is at most t, is determined in accordance with the following rules:

If all services share the same central queue of size x, then $J_i(t)$ is equal to $T_i(x/T-1)$ where $T_i$ was specified as the queue delay function above.

Further, if each service i has a unique queue size of $x_i$, then $J_i(t)$ is equal to $T_i(x_i/T-1)$ where $T_i$ was specified above.

Thus, the probability that jitter for a particular service i exceeds some threshold $J_{t,i}$ is $1-J_i(J_{t,i})$.

Thereafter, after determining the packet loss ratio, the average delay for each service and the probability that jitter for a particular service exceeds a predetermined threshold, the process passes to block 66 and terminates.

Upon reference to the foregoing, those skilled in the art will appreciate that by utilizing the modeling techniques set forth herein, the quality of service assessment for a packetized telecommunication traffic system which includes multimedia services within a shared transmission medium may be accurately and efficiently assessed despite the presence of diverse traffic types and characteristics. The method and system of the present invention utilize the characteristics of those services, the available network bandwidth, the number of users that are connected to the network to estimate the quality of service measurements and is able to distinguish between networks which utilize central queues and networks which utilize multiple separate queues for each service. The method and system set forth herein provides a model which is simple enough to be evaluated very rapidly and in real-time and which is accurate enough to be comparable with time-consuming numerical methods set forth in the prior art.

While the invention has been particularly shown and described with reference to a preferred embodiment, it will be understood by those skilled in the art that various changes in form and detail may be made therein without departing from the spirit and scope of the invention.

What is claimed is:

1. A method for assessing the quality of service for multimedia traffic under aggregate traffic conditions within a network which utilizes one or more queues for storage of received aggregate traffic, said method comprising the steps of:

modeling a network by specifying a total available bandwidth and a number and size of one or more queues for storage of received aggregate traffic;

modeling said aggregate multimedia traffic into constant bit rate services, variable bit rate real-time services and variable bit rate nonreal-time services in order to determine peak rates, average idle sojourn times and average burst sojourn times for each service;

determining a probability that said one or more queues will overflow based upon said determined peak rates, average idle sojourn times and average burst sojourn times for each service; and calculating a packet loss ratio for each service based upon said determined probability that said one or more queues will overflow.

2. The method for assessing the quality of service for a multimedia traffic under aggregate traffic conditions according to claim 1 further including the step of determining average fill sizes for said one or more queues based upon said determined peak rates, average idle sojourn times and average burst sojourn times for each service.

3. The method for assessing the quality of service for a multimedia traffic under aggregate traffic conditions according to claim 2 further including the step of calculating an average delay for each service based upon said determined average fill sizes.

4. The method for assessing the quality of service for a multimedia traffic under aggregate traffic conditions according to claim 1 further including the step of determining a probability that a delay for each service will exceed a predetermined threshold.

5. The method for assessing the quality of service for a multimedia traffic under aggregate traffic conditions according to claim 4 further including the step of calculating a probability that jitter for each service will exceed a predetermined threshold based upon said probability that a delay for each service will exceed a predetermined threshold.

6. The method for assessing the quality of service for a multimedia traffic under aggregate traffic conditions according to claim 3 further including the step of determining a probability that a delay for each service will exceed a predetermined threshold.

7. The method for assessing the quality of service for a multimedia traffic under aggregate traffic conditions according to claim 6 further including the step of calculating a probability that jitter for each service will exceed a predetermined threshold based upon said probability that a delay for each service will exceed a predetermined threshold.

8. A system for assessing the quality of service for multimedia traffic under aggregate traffic conditions within a network which utilizes one or more queues for storage of received aggregate traffic, said system comprising:

means for modeling a network by specifying a total available bandwidth and a number and size of one or more queues for storage of received aggregate traffic;

means for modeling said aggregate multimedia traffic into constant bit rate services, variable bit rate real-time services and variable bit rate nonreal-time services in order to determine peak rates, average idle sojourn times and average burst sojourn times for each service;

means for determining a probability that said one or more queues will overflow based upon said determined peak rates, average idle sojourn times and average burst sojourn times for each service; and means for calculating a packet loss ratio for each service based upon said determined probability that said one or more queues will overflow.

9. The system for assessing the quality of service for multimedia traffic under aggregate traffic conditions according to claim 8 further including means for determining average fill sizes for said one or more queues based upon said determined peak rates, average idle sojourn times and average burst sojourn times for each service.

10. The system for assessing the quality of service for multimedia traffic under aggregate traffic conditions according to claim 9 further including means for calculating an average delay for each service based upon said determined average fill sizes.

11. The system for assessing the quality of service for multimedia traffic under aggregate traffic conditions according to claim 8 further including means for determining a probability that a delay for each service will exceed a predetermined threshold.

12. The system for assessing the quality of service for multimedia traffic under aggregate traffic conditions according to claim 11 further including means for calculating a probability that jitter for each service will exceed a predetermined threshold based upon said probability that a delay for each service will exceed a predetermined threshold.

13. The system for assessing the quality of service for multimedia traffic under aggregate traffic conditions according to claim 10 further including means for determining a probability that a delay for each service will exceed a predetermined threshold.

14. The system for assessing the quality of service for multimedia traffic under aggregate traffic conditions according to claim 13 further including means for calculating a probability that jitter for each service will exceed a predetermined threshold based upon said probability that a delay for each service will exceed a predetermined threshold.

* * * * *